United States Patent
Deniaud et al.

(10) Patent No.: US 10,057,130 B2
(45) Date of Patent: Aug. 21, 2018

(54) D2HCP PROTOCOL IN AD HOC NETWORKS: MERGING OF SUB-NETWORKS AND ADDRESS CONFLICT RESOLUTION

(71) Applicant: AIRBUS DS SAS, Elancourt (FR)

(72) Inventors: Thierry Deniaud, Montigny le Bretonneux (FR); Karim El Shabrawy, Malakoff (FR)

(73) Assignee: AIRBUS DS SAS, Elancourt (FR)

( * ) Notice: Subject to any disclaimer, the term of this patent is extended or adjusted under 35 U.S.C. 154(b) by 547 days.

(21) Appl. No.: 14/654,642

(22) PCT Filed: Nov. 8, 2013

(86) PCT No.: PCT/EP2013/003370
§ 371 (c)(1),
(2) Date: Jan. 11, 2016

(87) PCT Pub. No.: WO2014/094937
PCT Pub. Date: Jun. 26, 2014

(65) Prior Publication Data
US 2016/0127193 A1    May 5, 2016

(30) Foreign Application Priority Data

Dec. 21, 2012  (FR) ..................................... 12 03587
Aug. 20, 2013  (FR) ..................................... 13 01963

(51) Int. Cl.
*G06F 15/16*  (2006.01)
*H04L 12/24*  (2006.01)
(Continued)

(52) U.S. Cl.
CPC .............. *H04L 41/12* (2013.01); *H04L 45/02* (2013.01); *H04L 45/74* (2013.01);
(Continued)

(58) Field of Classification Search
CPC ..... H04W 28/021; H04W 84/18–84/20; H04L 45/02; H04L 45/021; H04L 45/04;
(Continued)

(56) References Cited

U.S. PATENT DOCUMENTS

2003/0202477 A1 * 10/2003 Zhen ....................... H04L 45/26
                                                    370/248
2004/0174904 A1 *  9/2004 Kim .................. H04L 29/12216
                                                    370/475
(Continued)

OTHER PUBLICATIONS

International Search Report as issued in International Patent Application No. PCT/EP2013/003370, dated Apr. 4, 2014.
(Continued)

*Primary Examiner* — Brendan Higa
(74) *Attorney, Agent, or Firm* — Pillsbury Winthrop Shaw Pittman LLP

(57) ABSTRACT

A method for merging two sub-networks of an ad hoc network implementing the D2HCP routing protocol includes transmitting a first data set from the master node to the slave node, the first set including the identifiers of all the nodes of the sub-network containing the master node, the IP addresses of all the nodes of the sub-network containing the master node, each node identifier being associated with a single IP address, comparing each received IP address of the first set with the IP addresses of the routing table of the slave node in order to identify a list of duplicates corresponding to nodes of each sub-network having the same IP addresses.

21 Claims, 8 Drawing Sheets

(51) Int. Cl.
*H04L 12/751* (2013.01)
*H04L 29/08* (2006.01)
*H04L 29/12* (2006.01)
*H04W 12/06* (2009.01)
*H04L 12/741* (2013.01)
*H04L 29/06* (2006.01)
*H04W 84/20* (2009.01)
*H04W 40/02* (2009.01)

(52) U.S. Cl.
CPC ...... *H04L 61/2015* (2013.01); *H04L 61/2046* (2013.01); *H04L 61/2061* (2013.01); *H04L 61/2076* (2013.01); *H04L 61/6068* (2013.01); *H04L 63/0876* (2013.01); *H04L 67/1061* (2013.01); *H04L 67/1068* (2013.01); *H04W 12/06* (2013.01); *H04W 40/02* (2013.01); *H04W 84/20* (2013.01)

(58) Field of Classification Search
CPC .. H04L 61/20–61/2015; H04L 61/2046; H04L 67/1061; H04L 67/1065–67/1068; H04L 41/12; H04L 61/2061
See application file for complete search history.

(56) References Cited

U.S. PATENT DOCUMENTS

| | | | | |
|---|---|---|---|---|
| 2004/0264466 A1* | 12/2004 | Huang | ............... | H04L 45/123 370/392 |
| 2007/0174409 A1* | 7/2007 | Falck | ............... | H04W 48/14 709/208 |
| 2009/0146838 A1* | 6/2009 | Katz | ............... | G01D 4/006 340/870.02 |
| 2010/0150122 A1* | 6/2010 | Berger | ............... | H04W 4/02 370/338 |
| 2010/0208662 A1* | 8/2010 | Fuste Vilella | ............... | H04W 40/00 370/328 |
| 2011/0149858 A1* | 6/2011 | Hwang | ............... | H04W 40/26 370/328 |
| 2012/0224505 A1* | 9/2012 | Sadok | ............... | H04L 29/1232 370/254 |

OTHER PUBLICATIONS

Nesargi, S. et al., "MANETconf: Configuration of Hosts in a Mobile Ad Hoc Network," Proceedings IEEE INFOCOM 2002, The Conference on Computer Communications, 21$^{st}$ Annual Joint Conference of the IEEE Computer and Communications Societies, Jun. 23-27, 2002, vol. 2, pp. 1059-1068.

Luis Javier Garciá Villalba et al., "Distributed Dynamic Host Configuration Protocol (D2HCP)," Sensors, vol. 11, No. 12, Dec. 18, 2011, pp. 4438-4461.

Wangi, N.I.C., et al., "Address Autoconfiguration in Wireless Ad Hoc Networks: Protocols and Techniques," IEEE Wireless Communications, IEEE Service Center, vol. 15, No. 1, Feb. 1, 2008, pp. 70-80.

Luis Javier Garciá Villalba et al., "An Extension Proposal of D2HCP for Network Merging," Journal of Ubiquitous Systems & Pervasive Networks, vol. 3, No. 1 (2011), pp. 35-40.

* cited by examiner

D2HCP PROTOCOL IN AD HOC NETWORKS: MERGING OF SUB-NETWORKS AND ADDRESS CONFLICT RESOLUTION

CROSS-REFERENCE TO RELATED APPLICATIONS

This is the U.S. National Stage of PCT/EP2013/003370, filed Nov. 8, 2013, which in turn claims priority to French Patent Application No. 12/03587, filed Dec. 21, 2012 and French Patent Application No. 13/01963, filed Aug. 20, 2013, the entire contents of all applications are incorporated herein by reference in their entireties.

FIELD

The field of the invention relates to a first method for detecting a merging situation of two ad hoc sub-networks implementing the D2HCP protocol and a second method for starting merging to generate a single ad hoc network. More particularly, the invention relates to the management and rules for assigning IP addresses when two sub-networks discover each other.

STATE OF THE ART

Managing discoveries of new nodes in a network should take into account a mechanism for configuring the allocation of IP addresses of these new nodes. According to the network type and routing protocol implemented, there are different approaches for allocating IP addresses. The DHCP protocol enables a dynamic management of IP addresses to be carried out, in particular their allocation. On the other hand, DHCP requires a centralized server for managing its functions.

On the other hand, this protocol is not adapted to the ad hoc networks.

According to the solutions set forth hereinafter, one issue is to find a compromise between a first and a second approach.

According to a first approach:
a flexible architecture can be utilized in which each node manages few data regarding the other nodes;
a temporary allocation of addresses is necessary;
a step-by-step configuration is necessary.

According to a second approach:
a more complete architecture is contemplated in which the nodes have a good knowledge of the network
an implementation remains complex because of the dynamic processing that the nodes have to support
a node management complexity and an increase in the traffic are necessary.

A solution called MANETConf developed by Nesargi and Prakash enables the arrival of nodes in an ad hoc network to be managed. An entering node transmits a discovery message and establishes a first exchange with the node that first responds thereto. Then, an IP address allocation is performed by this node to the entering node provided that the IP address is left free by all the network nodes. The latter step requires transmitting messages in the network and waiting for responses from all the nodes. This solution has the drawback to manage a lot of messages through the network and thus results in a significant traffic.

Another solution imposes the implementation of the DAAP protocol which enables the arrival of nodes in a network to be managed by an algorithm for dynamically determining a master. In this solution, each node periodically sends discovering messages to nodes being neighbouring with the network identifier so as to detect merging situations. On the other hand, it is the master node that manages the highest level allocation of the network identifier and IP address. One problem with this solution is that if the master node is disconnected from the network to which it is attached, the service is no longer maintained. Further, it will form a new network and consequently, several networks will possibly have the same identifier. This protocol does not seem to be adapted to the issues of a mobile ad hoc network having to ensure a minimum level of security.

Another solution called "Buddy" system is based on a decentralized approach of a network. In this solution, each node comprises a set of free IP addresses provided for allocating addresses of new entering nodes. The address sets are disjoined from one node to the other. This system enables network merging situations to be managed by managing single network identifiers. One of the drawbacks of this system is the generation of a significant message traffic of a routing protocol congesting the ad hoc mobile network and thus its performance. In particular, network congestion is significant when a node enters or leaves the network to alert the other nodes.

A solution called EMAP, i.e. "Extensible MAGNET Autoconfiguration Protocol" enables a single address to be allocated to a node for communications internal to the MANET. An entering node generates valid IP addresses and checks their uniqueness via a "Duplicate Address Detection (DAD)" request.

A problem of this solution resides in the management of the uniqueness of the allocated addresses and risks of address conflicts that can occur in case of network merging.

Another solution called NOA-OLSR meaning "No Overlead Auto-configuration OLSR" enables a gradual entry of a new node into an ad hoc network to be managed. This solution comprises different configuration steps enabling an address to be dynamically allocated to a new entrant in the network. Although this solution allows an efficient utilization restricting the network load, one of the main drawbacks is the non-guarantee of the allocation of a single IP address to a node entering the network.

The D2HCP protocol based on a Buddy system type of architecture enables the allocation of a single IP address to a node entering an ad hoc network to be guaranteed. One advantage is that with this protocol associated with the OLSR routing protocol, each node has a good knowledge of the network topology and takes into account the arrivals and departures of the nodes in the network.

On the other hand, these mechanisms do not enable the discovery of a new sub-network to be currently managed, implying rules for allocating IP addresses to nodes on either side of each sub-network being discovered while keeping a generated data flow not disturbing the network performance.

SUMMARY OF THE INVENTION

The invention enables the abovementioned drawbacks to be solved.

The object of the invention first relates to a method for detecting a merging situation of two sub-networks of an ad-hoc network implementing the D2HCP addressing protocol, the first sub-network comprising a plurality of nodes and the second sub-network comprising a plurality of nodes, each node of each sub-network comprising a data set comprising:

an identifier of said node;

identifiers of the known nodes of an authentication data set of said node;

the IP address associated with the identifier of each node referenced in the authentication data set;

at least one identifier of the sub-network to which said node belongs.

Further, the method comprises:

a discovery of a second node of the second sub-network by a first node of the first sub-network, by receiving by the first node a so-called discovery data frame, transmitted by the second node for determining a situation requiring merging of both sub-networks;

an exchange of data, called setup data, between the first node and the second node, comprising:

the identifiers of each node;

the size of each sub-network;

the identifier of each sub-network;

a comparison of the sizes of each sub-network enabling a master node and a slave node to be defined from the first and the second nodes, the slave node retrieving a set of identifiers of the nodes of the sub-network of the master node as well as the IP addresses associated with each of said identifiers, the determination of the slave node and the master node enabling the merging of both sub-networks in a single network to be setup.

Advantageously, the authentication data set is a table comprising node identifiers and their associated IP addresses.

Advantageously, a merging situation requiring to merge both sub-networks is recognized by a first node when a discovery frame of a routing protocol is received from the second node and comprises an identifier unknown to the first node, and when the second node already has an IP address.

Advantageously, the setup data further comprise a variable indicating that a merging situation has started, called a merging variable.

Advantageously, a merging situation requiring to merge both sub-networks is recognized by a second node when it receives, from a first node that discovered it beforehand, a variable indicating that a merging situation has been recognized by the first node.

Advantageously, the master node generates a message, called a freeze message, to all the nodes known to its authentication data set, including to the slave node, a message comprising the identifiers of both sub-networks and an indication that a merging operation is instantiated.

Advantageously, each node receiving the freeze message suspends:

any other analysis regarding messages received from unknown nodes;

any IP address assignment of a new node of the network;

any other merging request from another node.

Advantageously, each node receiving the freeze message records the identifiers of both sub-networks and activates a standby state relative to the merging situation until it receives a message indicating that the merging phase has ended.

Advantageously, the size of a sub-network corresponds to the number of known nodes in the authentication data set of a node of said sub-network.

Advantageously, the slave node is the node belonging to the sub-network having the smallest size.

Advantageously, when the sizes of both sub-networks are identical, the slave node is chosen from the one which has the network identifier having the greatest value.

Advantageously, the identifier of the single merged network corresponds to the identifier of the node of the sub-network having the greatest value.

Secondly, another object of the invention relates to a method for merging two sub-networks of an ad-hoc network implementing the D2HCP routing protocol, a master node being determined from a first sub-network and a slave node being determined from the second sub-network, characterised in that the method comprises:

emitting a first data set from the master node to the slave node, said first set comprising:

the identifiers of all the nodes of the sub-network comprising the master node;

the IP addresses of all the nodes of the sub-network comprising the master node, each identifier of the node being associated with a single IP address, comparing each received IP address of the first set with the IP addresses of a second authentication data set of the slave node, the latter set comprising the identifiers and the IP addresses of the nodes known to the slave node of the second sub-network, so as to identify a list of duplicate nodes corresponding to nodes of the second sub-network having the same IP addresses as nodes of the first sub-network.

Advantageously, each node comprises a block of free IP addresses, the method comprising:

allocating a new IP address to at least one node having a duplicate IP address comprised in the previously defined list, the new address being chosen from the free IP addresses of the block of addresses of said node;

broadcasting the new IP address to the nodes of the second sub-network;

updating the routing table of the slave node of the second sub-network with at least the new IP address of the node having had a new assigned IP address.

Advantageously, a first allocation of a first block of IP addresses is generated in the node of the second sub-network having a duplicate IP address, the block being built from the initial block of said node.

Advantageously, a second allocation of a second block of IP addresses generated in the node of the first sub-network having a duplicate address with a node of the second sub-network, the first and second blocks not comprising IP addresses in common.

Advantageously, the method comprises:

building a new authentication data set of the nodes of both sub-networks;

the slave node building a new routing table with all the IP addresses of both sub-networks;

the slave node assigning the new identifier of the network comprising the nodes of both sub-networks;

broadcasting the data of the new authentication data set of the slave node to all the nodes of the new merged network.

Advantageously, the master node and the slave node are determined by the method for detecting a merging situation of two sub-networks.

BRIEF DESCRIPTION OF THE FIGURES

Further characteristics and advantages of the invention will become clearer upon reading the detailed description that follows, with reference to the appended figures, which illustrate.

DESCRIPTION

Figure 1:
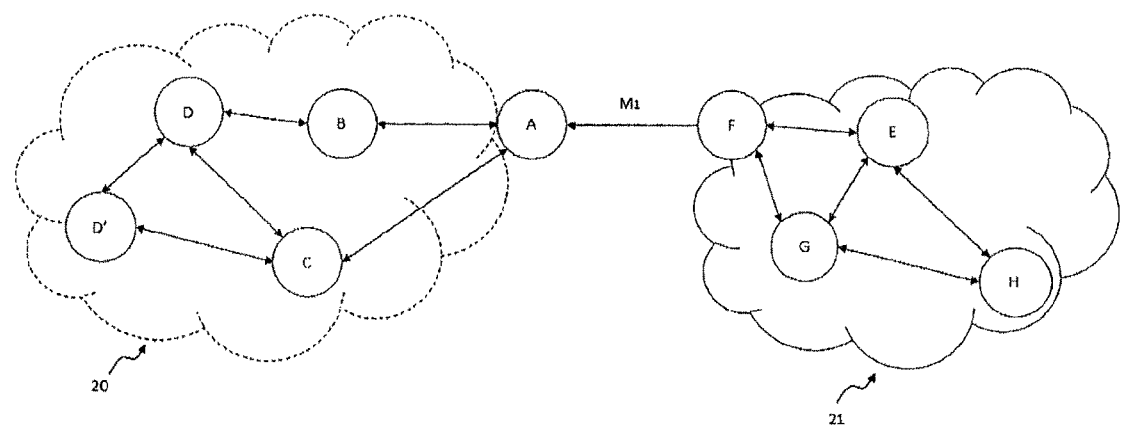
FIG. 1: two sub-networks discovering each other and using the method according to the invention.

FIG. 1 illustrates two sub-networks 20 and 21 initially isolated from each other. The first sub-network 20 comprises a plurality of nodes A, B, C, D, D'. The second sub-network 21 comprises a plurality of nodes E, F, G, H.

Each node of a sub-network knows the nodes of the same sub-network. A routing protocol enables a routing table to be updated enabling information of other nodes of a same sub-network to be distributed and recorded. An authentication data set SET1 can be stored in each node, this set is also called an ID TABLE because the authentication data can be stored as a database table. The latter can comprise the list of identifiers of each node known to a given node of a same sub-network. The ID TABLE table further comprises the list of IP addresses associated with each identifier of each node.

The ID TABLE table is updated at each discovery of a new node or when information is modified about the authentication of a node, as for example its IP address. Further, the ID TABLE table can comprise authentication certificates of the nodes or any other datum relating to the authentication of the nodes of a sub-network.

The ID TABLE table can be updated depending on the updates of the routing table; both tables can be related.

In summary, the ID TABLE table of a given node contains for each node known to this node of the same sub-network:
its single identifier
its IP address
authentication data (optional).

Each node of an ad hoc network comprises:
a routing table for carrying out services enabling the routing of messages to be performed;
an ID TABLE table for carrying out authentication services between the communications of nodes with each other.

Both tables can be used together to:
ensure a service synchronization, and;
ensure an update of the data of the tables.

The applications and services performing authentication checks within a given node rely chiefly on the ID TABLE table which comprises the physical identifiers of each node known to said given node.

FIG. 1 shows the case where a first node A of a first sub-network 20 discovers a second node F of a second sub-network 21. The discovery of the second node F is performed by receiving a message of the HELO or TC type routing protocol when the routing protocol is the OLSR protocol.

The first node A receiving a message from a second node F compares the identifier or IP address of the second node F which can be extracted from the received message in order to authenticate it. The first node A having neither the IP address nor the identifier in the routing tables or the ID TABLE detects a new node.

At this stage of the detection, the first node A can:
either conclude that a new node F accesses to the network and that it is necessary to instantiate a procedure enabling a new IP address to be assigned to the second node F;
or conclude that a new sub-network is potentially detected when the node discovered already has an IP address.

Figure 2:
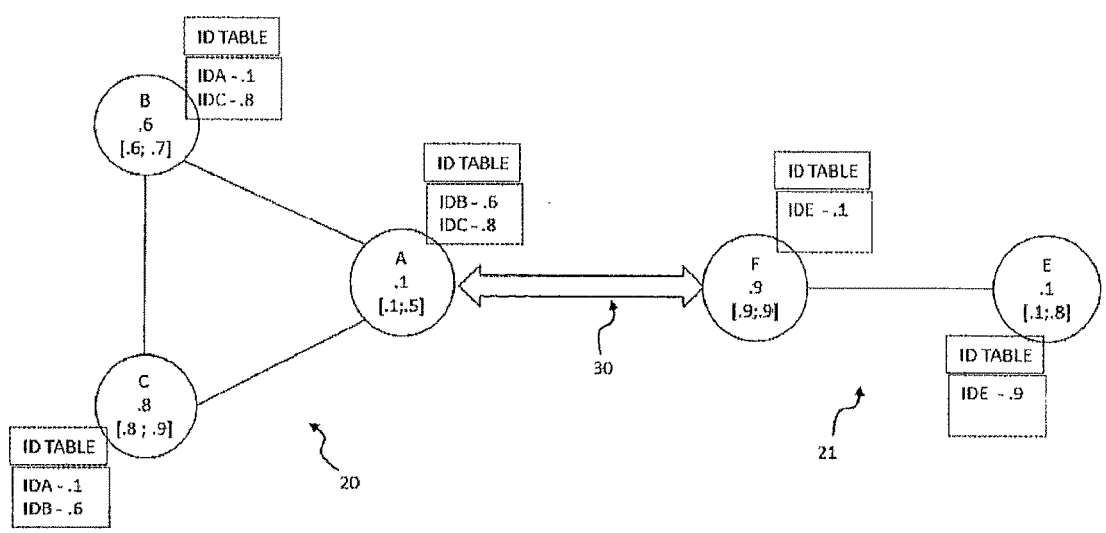
FIG. 2: the first discovery step of the method enabling a slave node and a master node to be determined.

The method for detecting a merging situation of two sub-networks 20, 21 thus comprises firstly:
receiving a message $M_1$ of a routing protocol, by any node, called a "discovering node" which is represented in the figure by the first node A, of a given sub-network;
extracting, by this first node A, the identifier of the transmitter of the message $M_1$ which is the second node F and then checking that the IDF identifier of the second node F is a new identifier, it is called a "discovery node", and is represented in FIG. 2 by the second node F;
checking the presence of an IP address associated with the new IDF identifier of the second node F in the data received by the first node A.

FIG. 2 represents a detailed scheme of some nodes of two sub-networks 20, 21. For the sake of understanding the invention and the clarity of the description, the first sub-network 20 is represented with only three nodes A, B, C, and the second sub-network is represented with only two nodes E, F.

In FIG. 2, the ID TABLE table of each node are represented. The ID TABLE table of a given node comprises the identifier and IP address of each node known to the same sub-network.

Each node comprises an IP address and a block of IP addresses defining a range comprising the address of the node in question and a list of free IP addresses (free IP addresses following the IP address of the node to the non-free IP address, affected to another node). The blocks of addresses are used in the ad hoc networks for dynamically assigning a new IP address to a node connecting to the network. Generally, the node responding first to an address request of a new entrant allocates to the new entrant on the one hand an IP address of its block and on the other hand a half-block of IP addresses (the block of addresses greater than the IP address provided). The assignment of the half-block of IP addresses enables:
the new entrant to obtain a list of available IP addresses if another new entrant comes to be connected to the sub-network thereafter;
the discovering node to keep a half-block of available IP addresses so as to allow other future assignments of IP addresses to new entrants.

The identifiers, IP addresses and blocks of IP addresses of the nodes of the first sub-network are (by way of example—NB: only the last digit of the IP addresses is represented):
Node A: IDA, @IP=0.1, block(@IP)=[0.1;0.5];
Node B: IDB, @IP=0.6, block(@IP)=[0.6;0.7];
Node C: IDC, @IP=0.8, block(@IP)=[0.8;0.9].

For convenience, the addresses and blocks of addresses are simplified in the present description.

The identifiers, IP addresses and blocks of IP addresses of the nodes of the second sub-network are (by way of example—NB: only the last digit of the IP addresses is represented):
Node E: IDE, @IP=0.1, block(@IP)=[0.1;0.8];
Node F: IDF, @IP=0.9, block(@IP)=[0.9;0.9].

Figure 7:
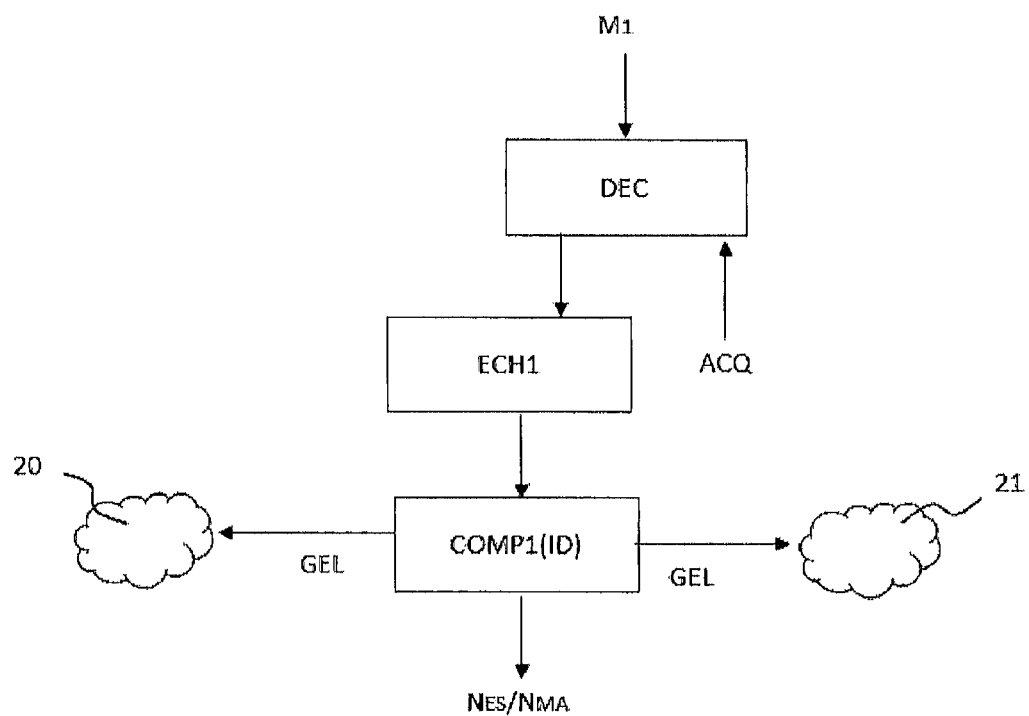
FIG. 7: the main steps of the method for determining slave and master nodes.

The method for detecting a merging situation of two sub-networks 20, 21 of an ad hoc network of the invention comprises different steps represented in FIG. 7 comprising:
a discovering step, noted DIS;
a data exchange step, noted EXCH1, and;
a comparison step, noted COMP1(ID).

These three steps are detailed in the following description through FIGS. 2 and 7.

The arrow 30 of FIG. 2 comprises the discovery message $M_1$ which corresponds to the first message received by the first node A from the second node F. The first message $M_1$ is a message of a routing protocol comprising at least: the identifier of the second node F and its IP address.

Further, the discovery frame $M_1$ can comprise an authentication certificate enabling the first node A to perform an authentication method enabling:
data exchanges to be secured between the node F and the node A, and/or;
the second node F to be authenticated by the first node A.

On the other hand, the arrow 30 comprises possibly other data that can be exchanged after receiving the message $M_1$:
an acknowledgment, noted ACK in FIG. 7, of the first node A to the second node F, or;
data exchanges EXCH1 corresponding to a second step of the method of the invention.

When the first node A detects a new identifier TDF and the presence of an address $IP_F$ of the second node F for the first time, a merging situation of both sub-networks is detected.

In this case, the first node A can also respond to the second node F by generating an acknowledgment ACK message informing the second node F that a discovery has occurred. The second node F thus also knows that a merging situation is to be contemplated. This feedback acknowledgment ACK message enables the second node F to detect in turn a new sub-network 20 and to identify a merging situation.

The first node A and the second node F can conduct in their own sub-network a merging non-competition verification: each of both nodes sends in its own sub-network a merging setup authorisation request and waits for the response from the nodes known to the sub-network. If one of the nodes known to the sub-network responds in the negative to the merging setup authorisation request, the merging can be interrupted in both sub-networks. If no negative response comes from one of the nodes known to the sub-networks in a given lapse of time, the merging can go on.

The first node A and the second node F then conduct a second step corresponding to a data exchange EXCH1 step, the data being called merging setup data or more simply setup data. The setup data exchange comprises the size of each sub-network, that is the number of nodes "p" known by the first node A in the first sub-network 20 and the number of nodes "q" known by the second node F in the second sub-network 21 respectively.

Further, the setup data exchange EXCH1 comprises the identifier $ID_{20}$ and $ID_{21}$ of each sub-network 20, 21.

According to the embodiments, identifier exchanges of the sub-networks 20, 21 can occur:
in the first step, that is upon transmitting the discovering message $M_1$ and/or during acknowledgment ACK exchanges if the routing protocol integrates this service;
in the second EXCH1 step during the setup data exchanges between the first node A and the second node F; this case is the one which is described in the embodiment of the invention.

If the first node A has not acknowledged the discovery frame $M_1$, then the data exchange EXCH1 can comprise the identifiers of the first and/or second nodes, A, F respectively. The case where no acknowledgment is sent from the first node A to the second node F, corresponds to the case where the data exchange EXCH1 step is directly instantiated by the first node A when the step of discovering DIS the second node F occurs.

If the first node A acknowledges the message $M_1$, it can in turn indicate to the second node F that a merging is detected, for example, a variable indicating that a merging can be generated in the acknowledgment message.

A first comparison COMP1(ID) step of the sizes p, q of each sub-network 20, 21 enables a slave node, noted $N_{SL}$, and a master node, noted $N_{MA}$, to be determined from the first node A and the second node F.

An exemplary implementation enables a rule to be defined, for electing the master node $N_{MA}$ and the slave node $N_{SL}$.

The sub-network having the smallest size in the case of FIG. 2 is the second sub-network 21 because it has less nodes than the first sub-network 20, there is: q=2<p=3. The determination of the sub-network having the smallest size enables to define the slave node as being the second node F.

Hereinafter in the description, a first node A is indifferently called: "node A", "first master node A" or "master node A", or "$N_{MA}$ node". Similarly, the second node F is indifferently called: "node F", "second slave node F", or "slave node A" or "$N_{SL}$ node" depending on the context.

The size of a sub-network corresponds to the size of the ID TABLE table of a given node of said sub-network since the table has as many inputs as nodes known to this given node. In the case of FIG. 2, the slave node is the second node F, that is the node initially discovered by the first node A. The master node $N_{MA}$ then corresponds to the node belonging to the sub-network having the greatest size, in the example of FIG. 2, this is the first sub-network 20.

There is $N_{MA}$=A and $N_{SL}$=F.

The invention is applicable in the same way if the node first discovered becomes the master node because of an ID TABLE table greater than the discovering node.

In the present description, a single case is described and corresponds to the case where the first node A first discovers the second node F, the node A comprising more inputs in the ID TABLE table than the second node F.

One advantage is to define a sequence enabling a step-by-step merging of two sub-networks 20, 21 to be started by defining a master/slave couple $N_{MA}/N_{SL}$ and distinct roles of each of both nodes of the couple.

This election of a master node $N_{MA}$ and a slave node $N_{SL}$ enables data exchanges to be coordinated in both sub-networks 20, 21 and conflict situations to be avoided in the merging procedure of said sub-networks 20, 21.

When the sizes of both sub-networks 20, 21 are identical, that is when there is the following equality p=q, then a second rule can be applied. The second rule can be for example: the sub-network having an identifier with the greatest value from both sub-networks being discovered, determines the master node $N_{NA}$. The network identifiers are defined so as to represent a numerical value. $ID_{20}</>ID_{21}$ are therefore compared.

The slave node $N_{SL}$ is consequently the node having the identifier with the smallest value.

When the master node $N_{MA}$ and slave node $N_{SL}$ are determined by the method for detecting a merging situation of the invention, some operations are forbidden within both sub-networks during performing the merging method of the invention.

For example, in one embodiment, the master node $N_{MA}$ prohibits any new allocation of an IP address to a node declaring itself in one of the sub-networks 20 or 21 as long as the merging is not ended.

This step enables that the course of the merging of both sub-networks 20, 21 is not altered by the assignment of new IP addresses to a node in one of both sub-networks. This situation could cause conflicts of duplicate IP addresses.

The master node $N_{MA}$ (respectively the node $N_{SL}$) sends to all the nodes of the sub-network 20 (respectively to all the nodes of the sub-network 21) a so-called "freeze" message, noted FREEZE. In FIG. 7, the message is sent on the one hand to the nodes B and C of the sub-network 20 and to the node E of the sub-network 21.

The FREEZE message is sent in both sub-networks 20, 21 as soon as the master node $N_{MA}$ and the slave node $N_{SL}$ are identified by the method for detecting a merging situation of the invention.

The FREEZE message comprises both identifiers $ID_{20}$, $ID_{21}$ of both sub-networks 20, 21 and an indicator indicating that a merging is underway.

The FREEZE message allows to indicate to each node that a merging has started and that some operations are blocked such as:
- the operation consisting in allocating an IP address to a new node declaring itself in one of both sub-networks;
- the operation consisting in initiating a new merging with another sub-network.

Hence, any new merging request of another node is then frozen. Indeed, this can occur when two sub-networks discover each other, several nodes can contribute to discovering nodes of the other sub-network.

When a node receives a FREEZE message, it records the identifiers $ID_{20}$, $ID_{21}$ of both sub-networks 20, 21 and enters a standby mode. The standby mode enables the node of a sub-network to keep listening to other messages for performing the merging of both sub-networks 20, 21.

Leaving the standby mode can be made in two ways:
- either at the expiration of a timer triggered until another message for continuing the merging procedure (unfreeze message) is received;
- or a so-called unfreeze message, noted UNFREEZE, is received and indicates that the merging is ended or discarded.

According to another embodiment, the FREEZE message can be sent as soon as the discovery step DIS is carried out, that is as soon as a node knows that a sub-network is present and a merging operation is about to start. This case does not enable both identifiers $ID_{20}$, $ID_{21}$ of both sub-networks 20, 21 to be sent to each node. This case would require to implement a particular processing of the node F which has sent a discovering message and which would receive as a feedback a FREEZE message comprising both identifiers $ID_{20}$, $ID_{21}$. However, this case remains a possible implementation of the method of the invention according to one embodiment.

In the present description, the FREEZE message is sent by the master node $N_{MA}$, that is the first node A, and the slave node $N_{SL}$, that is the second node F, as soon as the comparison COMP1(ID) of the sizes p, q of the sub-networks 20, 21 has been made as represented in FIG. 7.

Consequently, preferentially during the merging method of the invention, no routing message, of the HELLO or TC type when the OLSR protocol is carried out, from a potential other sub-network is accepted by the nodes of the first and second sub-networks 20 and 21.

When the second slave node F and the first master node A are determined, a merging method enables the merging of both sub-networks 20, 21 into a single ad hoc network to be made.

Figure 8:
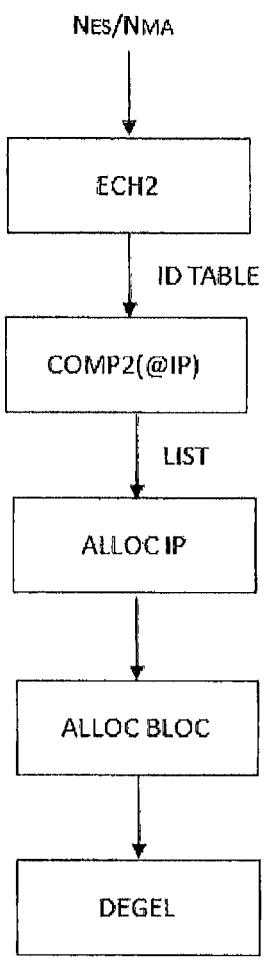
FIG. 8: the main steps of the method for merging two sub-networks.

FIG. 8 enables the different steps of the merging method of the invention to be represented. The merging method of both sub-networks starts when a slave node $N_{SL}$ and a master node $N_{MA}$ are identified on either side of each of both sub-networks 20, 21. The first step is noted EXCH2 and comprises a second "data exchange" between the first master node A and the second slave node F.

Figure 3:
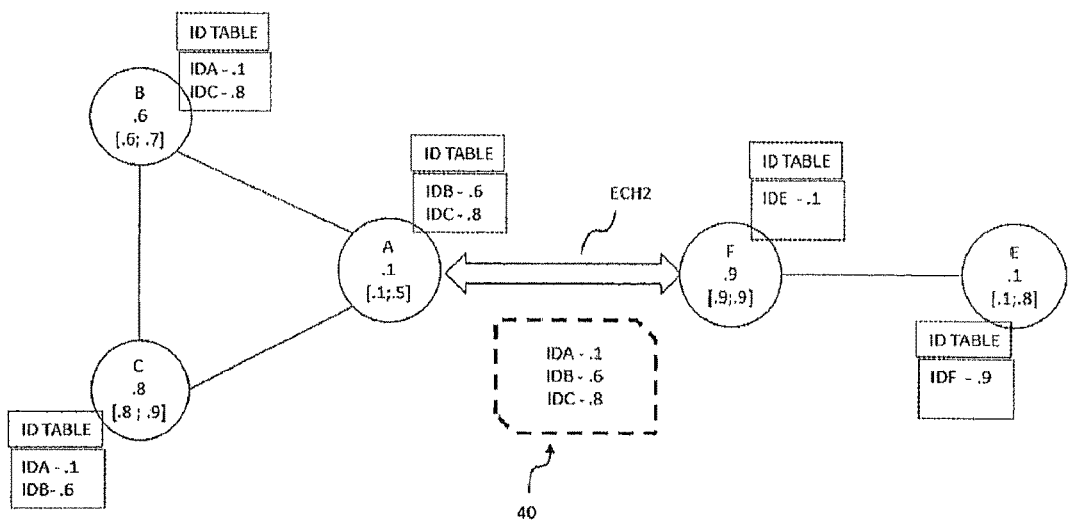
FIG. 3: the step of transferring IP addresses and identifiers of the sub-network from the master node to the slave node.

Further, FIG. 3 enables the first step EXCH2 of this merging method to be illustrated on the same architecture as FIG. 2.

The first step EXCH2 comprises sending 40 by the first node A (the master node) data of identifiers ID and IP addresses of the nodes A, B, and C of the first sub-network 20. The information of the ID TABLE table of the first master node A can be sent such that the second slave node F receives a table comprising all the IP addresses associated with the ID identifiers or the nodes of the sub-network 20 of the first master node A. The ID TABLE table of node A is noted: ID TABLE(A). The same notation is used for the other tables comprising authentication data of the other nodes. The table of the second slave node F is noted ID TABLE(F).

A comparison step, noted COMP2(@IP) in FIG. 8, of the merging method is made by the second slave node F. The comparison enables each IP address comprised in a first data set SET1 also considered as the ID TABLE(A) table received by the second slave node F to be compared with each IP address comprised in a second data set SET2 also considered as the ID TABLE(F) table contained in the second slave node F.

This comparison is necessarily performed by the slave node F since it is the second node F which has both tables after the ID TABLE(A) table is sent by the first node A.

Figure 4:
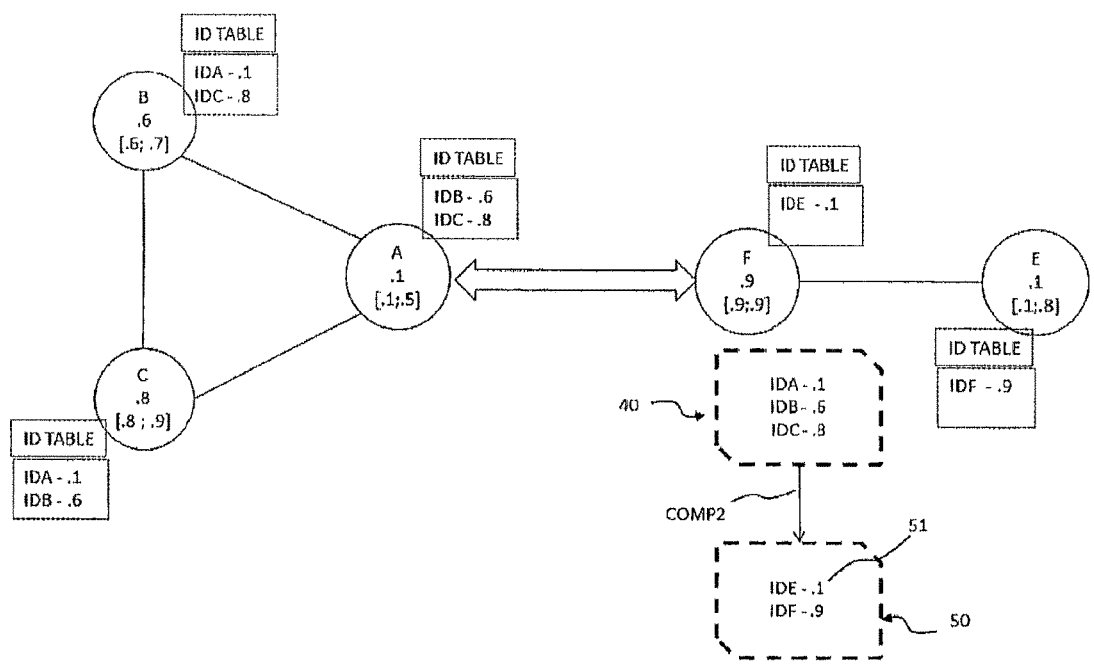
FIG. 4: the step of comparing duplicate IP addresses.

FIG. 4 represents this comparison step by comparing data sent from the ID TABLE(A) 40 and data 50 of the ID TABLE(F).

The merging method of the invention enables the duplicate IP address(es), such as the IP address, noted 51, having the value "0.1" of the node E of the second sub-network 21 which is identical to that of the node A of the sub-network 20 to be detected. The duplicate IP addresses are stored in a list of duplicates, noted LIST, which is set after the operation of comparison COMP2(@IP).

A node of the second sub-network 21 is called a "duplicate node" when its IP address is identical to an IP address of a node of the first sub-network 20.

When the duplicates have been identified by the second slave node F in the second sub-network 21, an allocation step ALLOC IP of new IP addresses starts.

Figure 5:
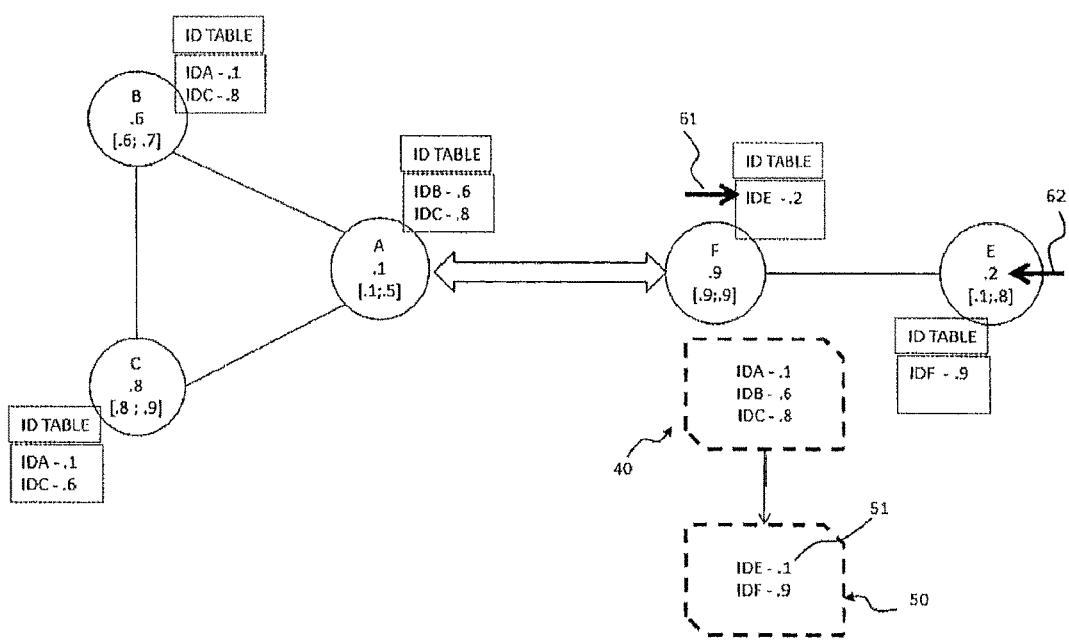
FIG. 5: the allocation of new IP addresses of the nodes having duplicate IP addresses.

FIG. 5 illustrates the allocation step ALLOC IP of new IP addresses to the duplicate nodes. Indeed, in the example of FIG. 5, a single duplicate node E is detected after the comparison step COMP2(@IP). Indeed, the value of the IP address of the node E is "0.1" and is identical to the value of the node A of the first sub-network 20.

The second slave node F sends a message to the duplicate nodes, that is in the example of FIG. 5 to the node E of the sub-network 21 so as to force the change of IP address of the duplicate node E. A new address "0.2" is assigned to the node E. It is chosen from the free IP addresses known to the slave node. Further, the block of addresses of the node A of the first sub-network 20 can be taken into account so as to guarantee that the new free address assigned 0.2 is actually free in both sub-networks.

The slave node can trigger a timer so as to wait for an acknowledgment of the duplicate node E. If the acknowledgment is not received at the end of the timer, an allocation message can be transmitted again to the duplicate node until an acknowledgment is generated to the second slave node F. If no acknowledgment is received by the second slave node F after N attempts, then the duplicate node E is considered disconnected and the allocation procedure is ended. This step is repeated for all the duplicate nodes when several duplicate nodes have been detected by the comparison step COMP(@IP) of the merging method.

When the second slave node F is a duplicate node, the procedure for allocating a new IP address is applied thereto.

In one embodiment, a second message is sent to the other nodes of the sub-network 21 such that all the nodes take into account the new IP address of the duplicate node E. Thus, each node can modify the IP address of the node E in its routing table and its identification data table ID TABLE.

Thus, in the example of FIG. 5, the assignment of the new IP address referenced 62 in FIG. 5 is noted: @IP(E)=0.2 and the modification in the ID TABLE(F) of this IP address is noted by reference 61.

A step of calculating the blocks of IP addresses, called ALLOC BLOCK, of the duplicate nodes of the second sub-network 21 starts together with or consecutively to the step of allocating the new IP address of the duplicate nodes.

Figure 6:
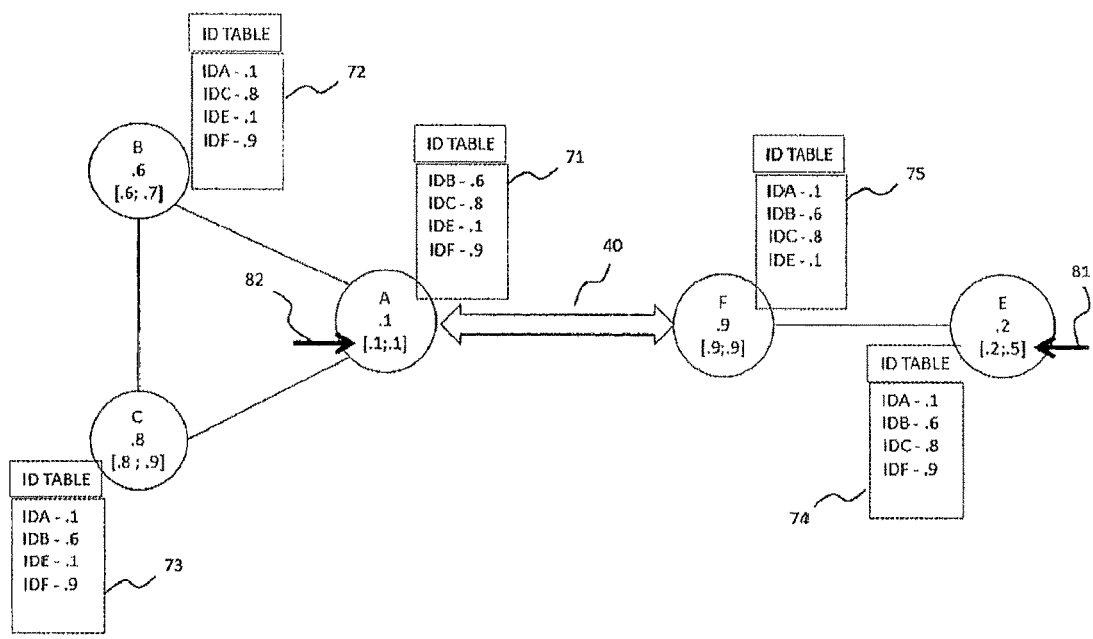
FIG. 6: the broadcasting of the new routing tables and ID TABLE within the merged network.

In the case of FIG. 6, the second slave node (F) calculates and transmits to the node E having changed its IP address a new block 81 (in the example, the block comes from the first block by truncating it). The first block [0.1;0.5] then becomes the second block [0.2;0.5] of the node E.

In a first embodiment, the second slave node F calculates and transfers to the first master node A: the block that has to be assigned to the node (j) of the first sub-network 20 which carries the address which was a duplicate of that of node E such that the master node A transmits this new block to the node (j). Further, if (i) is the node the block of free IP address of which comprises the IP address the slave node F has chosen for the duplicate node E, the slave node F calculates and transfers to the node (i) its block of free IP address.

In one second embodiment, the updated data of IP addresses and of new blocks can be transmitted with a UNFREEZE message as described hereinafter in the UNFREEZE step.

The same operation is applicable if the duplicate IP address regards a node other than the first master node A of the first sub-network 20. The first master node A can then perform the assignment of a new block 82 in the first sub-network 20 to the node having a duplicate IP address with a duplicate node of the second sub-network 21.

The initial block [0.1;0.5] of the first node A is calculated again after identifying the duplicates of both sub-networks 20, 21. The second block thus calculated is [0.1;0.1].

The generation of a complementary block enables to avoid that values of free IP addresses are common between the node E and the node A. This would compromise the operation of the merged network accordingly.

An acknowledgment is sent from each duplicated node performing a change of IP addresses to the second slave node F.

The second slave node F can in turn send a message to the first master node A when an IP address and a new block have been assigned to a duplicate node of the second sub-network 21.

A unfreeze step, noted UNFREEZE in FIG. 8, is started by the second slave node F when all the address conflicts have been solved.

The UNFREEZE comprises broadcasting a message to all the nodes of both sub-networks 20, 21 indicating that the UNFREEZE step has ended; this message comprises the identifier of the second slave node. Further, a new network identifier $ID_{22}$ is broadcast to all the nodes of both sub-networks 20, 21.

In this stage, in one embodiment, the UNFREEZE message can comprise the new assigned IP addresses as well as the new blocks which have been calculated when this step had not been made yet.

The nodes of the first sub-network 20 receiving the UNFREEZE message can:
- update the new IP addresses assigned to the duplicate nodes of the second sub-network 21,
- calculate the new complementary blocks, and;
- associate the identifiers to the IP addresses.

In another embodiment, the new IP addresses and the distribution of the blocks among the nodes are automatically known to the nodes of the network through the routing protocol and the distribution protocol of the IP addresses in the network after unfreezing the sub-networks.

The UNFREEZE message can comprise a timer for taking into account new data of the OLSR protocol, namely the new identifiers and the discovery of new nodes in the merged network.

The timer can be triggered within each node of the new merged network so as to wait for each node to take into account the new network topology. Thus, no new discovery of another sub-network, or assignment of a new IP address of a new node is performed until the end of an allotted time enabling the merging method to be completed.

According to an embodiment, the new network identifier $ID_{D22}$ is calculated in the following way: a comparison is performed between the identifier $ID_{20}$ of the first sub-network and the identifier $I_{21}$ of the second sub-network. The greatest identifier from both identifiers is selected as the identifier of the merged network, there is: $MAX(ID_{20}, ID_{21})=ID_{22}$.

Each node is capable of calculating the new identifier of the merged network or verifying that the identifier of the received merged network is the right one. In one embodiment, as previously described, it is the slave node that indicates the new identifier of the merged network to the network nodes.

Each node of the merged network calculates its routing table as well as the table comprising its authentication data ID TABLE.

One advantage of the method for detecting a merging situation and the merging method of the invention is to ensure merging of ad hoc sub-networks according to a sequence which enables any conflict of IP addresses to be avoided.

Further, the invention relates to a system for carrying out the methods of the invention. The system comprises a plurality of nodes of a network, such as mobiles. The nodes comprise at least one memory for storing routing tables of the authentication data. Further, each node comprises calculating means for performing operations defined in the steps of the method for detecting a merging situation and the steps of the merging method of the invention.

The invention claimed is:

1. A method for detecting a merging situation of two ad-hoc sub-networks implementing a D2HCP addressing protocol, the first sub-network comprising a plurality of nodes and the second sub-network comprising a plurality of nodes, each node of each sub-network comprising a data set comprising an identifier of said node;

identifiers of the known nodes of an authentication data set of said node;

an IP address associated with the identifier of each node referenced in the authentication data set;

at least one identifier of the sub-network to which said node belongs, the method comprising:

discovering a second node of the second sub-network by a first node of the first sub-network, by receiving by the first node a discovery data frame, transmitted by the second node for determining a situation requiring merging of both sub-networks;

exchanging setup data between the first node and the second node, comprising:

the identifiers of each node;

a size of each sub-network;

the identifier of each sub-network;

comparing the sizes of each sub-network enabling a master node and a slave node to be defined from the first and the second nodes, the slave node retrieving a set of identifiers of the nodes of the sub-network of the master node as well as the IP addresses associated with each of said identifiers, the determination of the slave node and the master node enabling the merging of both sub-networks in a single network to be setup.

2. The method according to claim 1, wherein the authentication data set is a table comprising node identifiers and their associated IP addresses.

3. The method according to claim 1, wherein a merging situation requiring to merge both sub-networks is recognized by a first node when a discovery frame of a routing protocol is received from the second node and comprises an identifier unknown to the first node, and when the second node already has an IP address.

4. The method according to claim 1, wherein the setup data further comprise an indication that a merging situation has started.

5. The method according to claim 1, wherein a merging situation requiring to merge both sub-networks is recognized by a second node when it receives, from a first node that discovered it beforehand, a variable indicating that a merging situation has been recognized by the first node.

6. The method according to claim 1, comprising, by the master node, generating a freeze message, to all the nodes known to its authentication data set, including to the slave node, the message comprising the identifiers of both sub-networks and an indication that a merging operation is instantiated.

7. The method according to claim 1, comprising, by the slave node generating a freeze message, to all the nodes known to its authentication data set, the message comprising the identifiers of both sub-networks and an indication that a merging operation is instantiated.

8. The method according to claim 6, wherein each node receiving the freeze message suspends:

any other analysis regarding messages received from unknown nodes;

any IP address assignment of a new node entering a sub-network;

any other merging request from another node.

9. The method according to claim 6, wherein each node receiving the freeze message records the identifiers of both sub-networks and activates a standby state relative to the merging situation until it receives a message indicating that the merging phase has ended.

10. The method according to claim 1, wherein the size of a sub-network corresponds to the number of nodes known in the authentication data set of a node of said sub-network.

11. The method according to claim 1, wherein the slave node is the node belonging to the sub-network having the smallest size.

12. The method according to claim 1, wherein when the sizes of both sub-networks are identical, the slave node is chosen from the one which has the network identifier having the greatest value.

13. The method according to claim 1, wherein the identifier of the single merged network corresponds to the identifier of the node of the sub-network having the greatest value.

14. A method for merging two sub-networks of an ad-hoc network implementing a D2HCP routing protocol, each sub-network having a network identifier, a master node being determined from a first sub-network and a slave node being determined from a second sub-network, the slave node being the node belonging to the sub-network having the smallest size, or when the sizes of both sub-networks are identical, the slave node being chosen from the one that has the network identifier having the greatest value, the method comprising:

emitting a first data set from the master node to the slave node, said first set comprising:

the identifiers of all the nodes of the sub-network comprising the master node;

the IP addresses of all the nodes of the sub-network comprising the master node, each identifier of the node being associated with a single IP address, comparing each received IP address of the first set with the IP addresses of a second authentication data set of the slave node, the latter set comprising the identifiers and the IP addresses of the nodes known to the slave node of the second sub-network, so as to identify a list of duplicate nodes corresponding to nodes of the second sub-network having the same IP addresses as nodes of the first sub-network.

15. The merging method according to claim 14, wherein each node comprises a block of free IP addresses, the method comprising:

allocating a new IP address to at least one node having a duplicate IP address comprised in the previously defined list, the new address being chosen from the free IP addresses known to the slave node;

broadcasting the new IP address to the nodes of the second sub-network;

updating the second authentication data set of the slave node of the second sub-network with at least the new IP address of the node having had a new assigned IP address.

16. The merging method according to claim 15, wherein a first allocation of a new block of IP addresses is generated in at least one duplicate node of the second sub-network, the block being built from the IP address of said duplicate node and the block of IP addresses in which the slave node has chosen the new IP address of the duplicate node.

17. The merging method according to claim 16, wherein a second allocation of a new block of IP addresses generated in the node of the first sub-network having a duplicate address with a node of the second sub-network, the new block not comprising IP addresses in common with other existing blocks.

18. The merging method according to claim 16, wherein a third allocation of a new block of IP addresses generated in the node of the first sub-network or of the second sub-network, the initial block of which contains the new IP address affected to at least one duplicate node of the second sub-network, the new block not comprising IP addresses in common with other existing blocks.

19. The merging method according to 14, further comprising
    building by the slave node a new authentication data set of the nodes of both sub-networks;
    building a new routing table with all the IP addresses of both sub-networks in each node of the merged network;
    assigning by the slave node the new identifier of the merged network comprising the nodes of both sub-networks;
    broadcasting the data of the new authentication data set of the slave node to all the nodes of the new merged network.

20. The merging method according to claim 14, wherein the master node and the slave node are determined by a method according to claim 1.

21. A system for detecting a merging situation and a merging situation of two ad-hoc sub-networks implementing a D2HCP addressing protocol, the first sub-network comprising a plurality of nodes and the second sub-network comprising a plurality of nodes, wherein at least one first node of the first sub-network and a node of the second sub-network enable to carry out the method for detecting a merging situation of claim 1.

* * * * *